Feb. 13, 1951     C. E. DEARDORFF ET AL     2,541,958
VALVE ACTUATING MECHANISM FOR HYDRAULIC MOTORS
Filed May 31, 1949                                                4 Sheets—Sheet 1
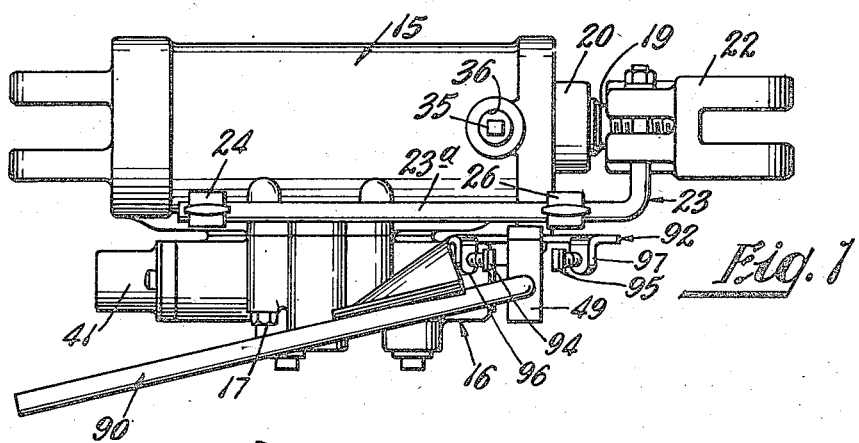
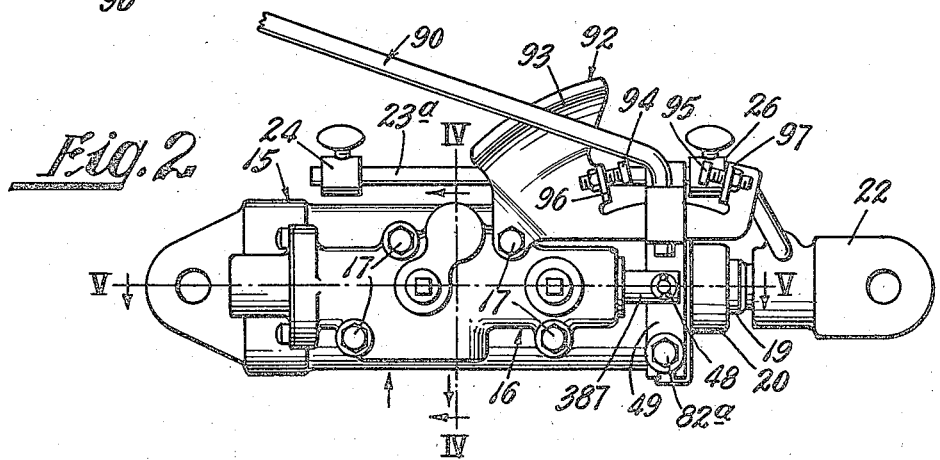
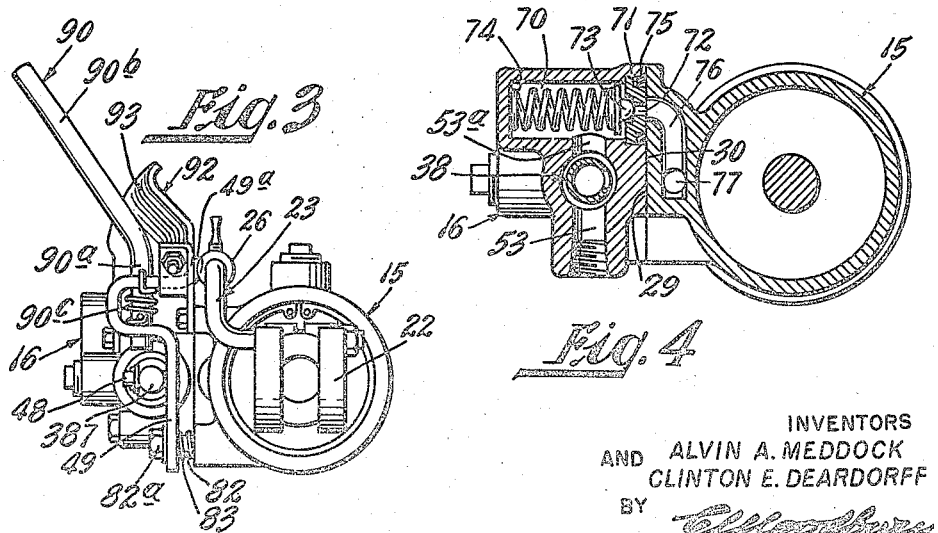
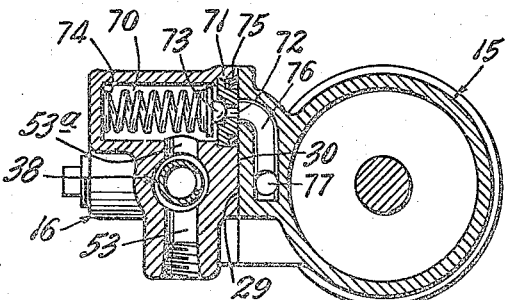
INVENTORS
ALVIN A. MEDDOCK
AND CLINTON E. DEARDORFF
BY
ATTORNEY

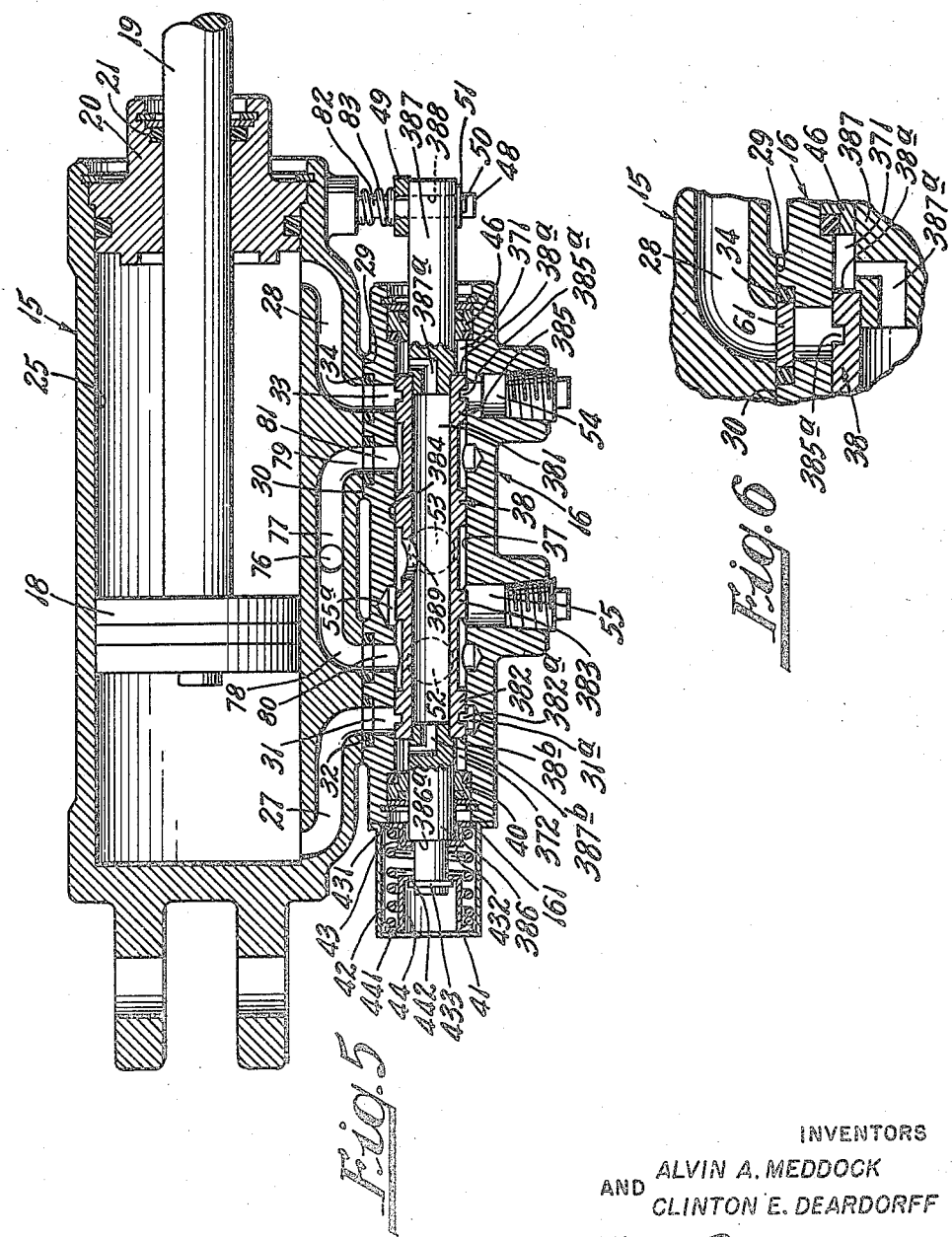

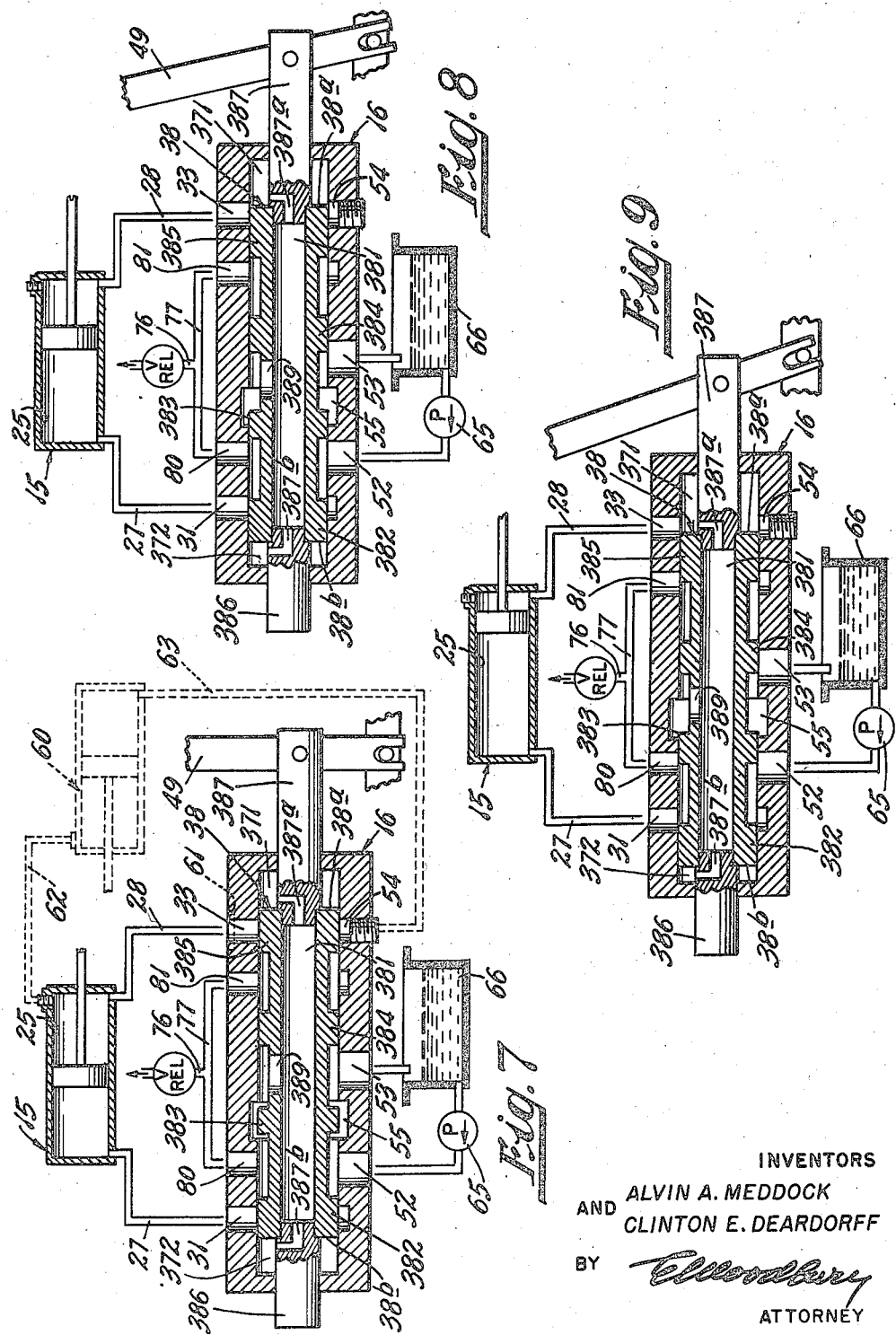

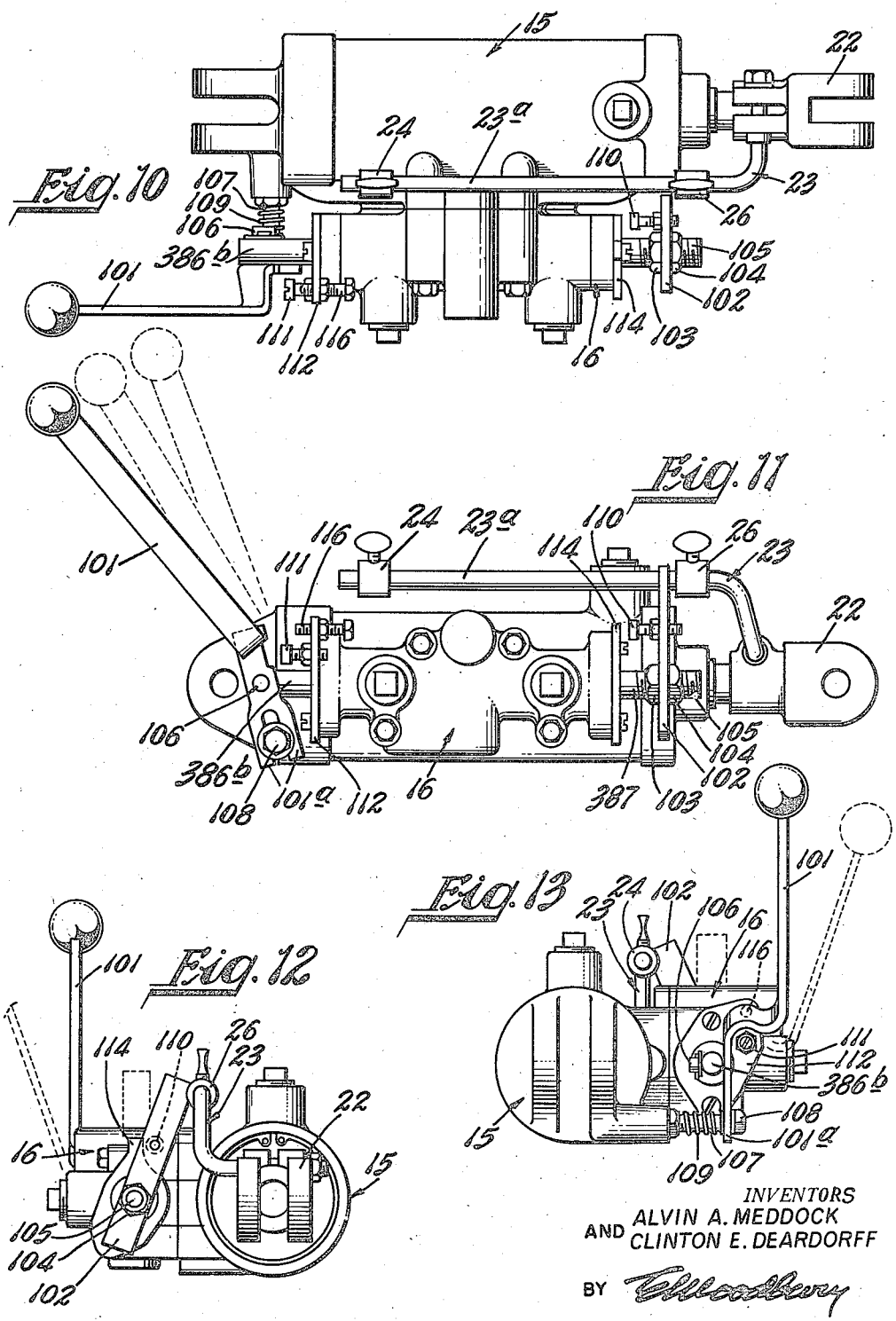

Patented Feb. 13, 1951

2,541,958

UNITED STATES PATENT OFFICE 2,541,958

VALVE ACTUATING MECHANISM FOR HYDRAULIC MOTORS

Clinton E. Deardorff, San Fernando, and Alvin A. Meddock, North Hollywood, Calif., assignors to Bendix Aviation Corporation, South Bend, Ind., a corporation of Delaware Application May 31, 1949, Serial No. 96,267

9 Claims. (Cl. 121—38)

1

This invention relates to the control of hydraulic motor units consisting of a motor cylinder and an associated valve, and has to do particularly with the mechanism for actuating the valve.

The invention is particularly useful in the hydraulic control of ground-working or agricultural implements used with tractors and actuated by pressure fluid supplied from an engine-driven pump on the tractor.

In systems of this latter type it is desirable to have: (1) automatic unloading of the pump except during movement; (2) choice of either: (a) selective movement into any desired position accurately controllable by the operator, or (b) automatic movement into a predetermined position; and (3) either slow or fast movement under ready control of the operator.

An object of the invention is to provide the foregoing desirable operating characteristics with a simple, inexpensive and reliable structure.

Other more specific objects and features of the invention will become apparent from the description to follow.

Briefly, the invention comprises a double-acting hydraulic cylinder motor and control valve assembly in which, according to the way in which the handle of the valve is manipulated, the motor can be moved in either direction, either rapidly or slowly, and stopped in any portion of its travel under the full control of the operator, or can be started in either direction by the operator and automatically stopped when it reaches a preselected position or the end of its stroke.

This is in part a continuation of our application Serial No. 5,798, filed February 2, 1948, entitled "Hydraulic Motor and Valve Assembly."

Referring to the drawing:

Fig. 1 is a plan view of a hydraulic cylinder motor and valve assembly in accordance with the invention;

Fig. 2 is a front elevation of the assembly;

Fig. 3 is a right end elevation of the assembly;

Fig. 4 is a vertical section taken in the plane IV—IV of Fig. 2;

Fig. 5 is a horizontal section taken in the plane V—V of Fig. 2;

Fig. 6 is a detail section taken in the same plane as Fig. 5. but showing a method of blocking one of the passages;

Figs. 7, 8 and 9 are schematic diagrams illustrating the operation of the system;

Figs. 10, 11 and 12 are plan, front elevational, and right elevational views corresponding to Figs. 1, 2 and 3, respectively, but showing a modification of the valve-actuating mechanism; and Fig. 13 is a left end elevational view of the assembly shown in plan in Fig. 10.

Referring first to Figs. 1, 2 and 3, the complete assembly therein depicted comprises a motor cylinder unit 15 and a valve unit 16, the two units being detachably secured together by cap screws 17.

The motor cylinder unit 15 contains a piston 18 (Fig. 5) to which is connected a conventional piston rod 19 which extends through one end 20 of the cylinder and is sealed with respect thereto by a conventional seal 21. Exterior of the end wall 20, the piston rod 19 (Figs. 1 and 2) is secured to a clevis 22 by means of which it is connected to whatever device is to be controlled by the assembly. There is connected to the clevis 22 for reciprocation therewith a piston rod member consisting of a bent rod 23 having a straight portion 23a extending parallel to the piston rod 19, which straight portion carries a pair of longitudinal adjustable collars 24 and 26 for automatic restoration of the control valve to neutral position, as will be described later.

The cylinder 25 of the motor cylinder unit 15 has fluid passages 27 and 28 which extend from opposite ends of the cylinder 25 and terminate in an exterior face 29 of the motor cylinder unit, which face seats against a corresponding face 30 on the valve unit 16. A motor port 31 in the valve unit is juxtaposed to the cylinder port 27 and is sealed with respect thereto by a sealing ring 32. A motor port 33 in the valve unit 16 is juxtaposed to the cylinder passage 28 and is sealed with respect thereto by a seal 34. In addition to the passage 28, communication with the right end of the cylinder 25 is provided for by an external auxiliary port 36 (Fig. 1) leading to the exterior of the motor cylinder unit, which port is normally plugged by a plug 35.

The valve unit 16 has a longitudinal bore 37 constituting a valve cylinder in which a control member consisting of a valve piston 38 is reciprocable. The main portion of this valve piston 38 is hollow, providing an internal passage 381 and has four external lands 382, 383, 384 and 385 which seal with the valve cylinder 37. Pressed into opposite ends of the hollow piston 38 are a pair of end members 386 and 387. The end member 386 extends through and seals with a valve cylinder end closure member 40 and cooperates with a centering spring mechanism positioned within an end cap 41 on the valve unit 16. This centering mechanism comprises a helical compression spring 42 which is compressed between an exterior flange 431 on a thrust element 43 and an exterior flange 441 on a thrust element 44, thereby urging these two thrust elements apart. When the valve piston 38 is in neutral position, as shown in Fig. 5, the external flange 431 of the thrust element 43 rests against a shoulder 161 constituted by the left end of the valve unit 16, and the flange 441 rests against the outer end of the cap 41. The thrust element 43 has an internal flange 432 which bears against a shoulder 386a on the end member 386 so that leftward movement of the valve piston 38 must result in compression of the spring 42. Likewise the thrust element 44 has an inwardly extending flange 442 which bears against a split ring 433 on the end member 386, preventing movement of the valve piston 38 to the right without compression of the spring 42.

The valve piston extension 387 extends through and seals with an end closure member 46 at the right end of the valve cylinder, and has a transverse hole 388 therein for receiving an actuating pin 48, the latter extending from a lever 49 and being retained in the hole 388 by a cotter pin 50 and washer 51.

The valve cylinder 37 (Fig. 5) is intersected by the motor ports 31 and 33 which extend thereinto horizontally. The valve cylinder is also intersected by a pressure port 52 and an exhaust port 53 which extend thereinto from the underside. A normally plugged port 54 is juxtaposed to the cylinder port 33. Another permanently plugged port 55 cooperates with the land 383 to by-pass fluid direct from the pressure port 52 to the exhaust port 53 when the valve is in neutral position.

The hydraulic circuits will be readily apparent from inspection of Figs. 7, 8 and 9. Fig. 7 shows the arrangement when an auxiliary motor 60 is to be operated in synchronism with the motor 15. Under this condition the cylinder passage 28 is blocked by insertion of a plug 61 (Fig. 6) in the recess which contains the sealing ring 34, and the plug 35 (Fig. 1) is removed, and the port 36 is connected by a duct 62 (Fig. 7) to one end of the auxiliary motor 60, the other end of this cylinder being connected by a duct 63 to the port 54 of the valve. Since the port 54 and the motor port 33 (Fig. 5) are intercommunicated, fluid is supplied directly from the port 54 to the right end of the auxiliary motor cylinder 60 instead of to the right end of the motor cylinder 25, and fluid is supplied from the left end of the auxiliary cylinder 60 to the right end of the motor cylinder 25. Fluid connection between the left end of the motor cylinder 25 and the valve unit remains unchanged.

As shown in Fig. 7, the valve is in neutral position, in which pressure fluid supplied by a pump 65 to the pressure port 52 is by-passed through the blind port 55 past the piston land 383 to the exhaust port 53 from which it flows back to the reservoir 66.

Referring now to Fig. 8, the valve piston is shown moved to the left a short distance sufficient to carry the land 383 past the blind port 55, thereby cutting off by-pass of pressure fluid from the pressure port 52 to the exhaust port 53. At the same time, the piston land 382 permits throttled flow of pressure fluid into the jack port 31 and the left end of the motor cylinder 25. At the same time, the motor port 33 connected with the right end of the motor cylinder 25 is uncovered by the piston land 385, permitting flow of fluid into the right end 371 of the valve cylinder and thence through a passage 387a in the right piston extension 387 into the exhaust passage 381 within the piston 38, which exhaust passage is constantly communicated by a piston port 389 with the main exhaust port 53. At small openings of the valve, as shown in Fig. 8, the pressure drop past the land 382 into the motor port 31 and past the land 385 into the valve cylinder end 371 is large as compared to the pressure drop through the passage 387a, so that the pressure developed in the cylinder end 371 does not exert sufficient force against the right end face 38a of the piston 38 to overcome the restoring force of the centering spring 42 (Fig. 5). Therefore, if the manual force holding the valve in slightly open position, as shown in Fig. 8, is removed, the centering spring 42 will automatically restore the valve to neutral position. This operation is the same if the valve is moved in the other direction out of neutral, the pressure force against the left end 372 of the valve piston produced by the pressure drop through the passage 387b in the left piston extension being insufficient to overcome the restoring spring.

However, if the valve is moved into wide open position, as shown in Fig. 9, the pressure drop past the land 385 becomes relatively small as compared to the pressure drop in the passage 387a, so that the pressure in the right end 371 of the valve cylinder is sufficient to overcome the force of the centering spring 42 and maintain the valve in open position even though the manual force that opened the valve is removed. The valve then remains in open position until it is automatically restored to neutral by a mechanism to be described later.

The particular valve construction shown in Fig. 5 is relatively inexpensive, since the valve cylinder 37 has no internal annular ports requiring special machining operations. The necessity of the usual annular ports or recesses is avoided by balancing each of the ports with an opposite blind port. As an example, the port 31 has a balancing blind port 31a which is produced in a single machining operation with the port 31. Similarly the ports 52 and 53 have corresponding blind ports. In some positions of the valve piston 38, the land 382 completely covers the port 31 and its cooperating blind port 31a, and hence this land 382 is provided with a circumferential groove 382a which functions to equalize the pressures in the ports 31 and 31a at all times. Similarly a circumferential groove 385a in the land 385 interconnects the ports 33 and 54 to equalize the pressures therein.

It is usually desirable in systems of the type to which this invention relates to provide a relief valve at some point in the system to prevent the development of excessive pressures. In accordance with the invention, the relief valve is economically incorporated in the valve unit. Thus as shown in Fig. 4, there is provided immediately above the exhaust port 53 a balancing port 53a which communicates with a relief valve chamber 70 which is formed in the valve unit 16 and opens into the face 30 thereof. The valve chamber 70 is closed by a closure plate 71 containing a port 72, the inner end of which constitutes a seat for a ball valve 73 which is urged against the seat by a helical compression spring 74. The closure plate 71 is sealed with respect to the face 29 of the motor cylinder unit by a sealing ring 75. The port 72 in the closure plate 71 communicates with a port 76 in the motor cylinder unit 15 which port (Fig. 5) communicates with a passage 77 in the motor cylinder unit which terminates in a pair of ports 78 and 79 in the face 29. These ports normally intercommunicate a pressure port 80 in the valve unit, which is in constant communication with the main pressure port 52, and a port 81, which is in constant communication with the annular space defined within the valve cylinder between the piston lands 384 and 385, and through which pressure fluid is supplied to the motor port 33 connected with the right end of the motor cylinder 25. It will be apparent therefore that the ball valve 73 is at all times exposed to the full pressure in the pressure port 52 and is at all times effective to relieve excessive pressures by exhausting fluid through the valve chamber 70, the port 53a, and the valve cylinder, into exhaust port 53.

As previously mentioned, the valve piston extension 387 is connected by a pin 48 to an actuating lever 49. Referring to Figs. 1, 2 and 3, this actuating lever 49 is bifurcate at its lower end and straddles a stationary screw 82 which is screwed into the motor unit 15. The head 82a of the screw limits movement of the lower end of the lever 49 outwardly, and the lever is yieldably urged against the head 82a by a compression spring 83. This spring 83 normally retains the lever 49 in the position shown in Figs. 1 and 3, in which the upper end 49a of the lever 49 is in the path of the stop collars 24 and 26 on the rod 23a. Under these conditions, by suitably positioning the collars 24 and 26 on the rod 23a, they can be caused to contact the lever 49 and restore it to neutral position in response to movement of the motor piston rod 19 into predetermined positions.

The lever 49 can be actuated by a handle 90, which consists of a bent rod having a short straight portion 90a which extends through a pair of holes provided therefor in an intermediate U-shaped portion of the lever 49, this section 90a of the rod being free to rotate about an axis extending substantially radially from the pivot pin 82. The major portion 90b of the control handle 90 extends at an angle to the section 90a and is adapted to be grasped at its outer end by the operator. Cooperating with the section 90b of the handle is a stationary fulcrum member 92 having a face 93 juxtaposed to the handle 90 in all positions of the latter. A torsion spring 90c (Fig. 3) encircling the portion of the straight part 90a of the rod that is within the U-shaped part of the lever 49 urges the portion 90b of the handle 90 toward the fulcrum member 92 at all times, but with insufficient force to overcome the helical compression spring 83.

There are many circumstances under which it is desirable to cause the motor piston rod 19 to move rapidly in one direction or the other of its stroke and be stopped automatically at positions determined by the settings of the collars 24 and 26. Under these circumstances, the operator simply swings the handle 90 about the pin 82 through a first path in direction to rock the lever 49 through a first path about the pivot pin 82 in which the spring 83 is not compressed, and releases the handle. This opens the valve into fully opened position as previously described with reference to Fig. 9, under which conditions the valve automatically holds open until it is positively restored, and restoration is effected by contact of the upper end 49a of the lever 49 by one or the other of the collars 24 and 26, because the said first path of the lever 49 is in the path of the collars 24 and 26.

There are other occasions in which it is desirable to effect slow movement of the piston rod 19 and stop it in a selected position. This operation can best be performed by rocking the handle 90 into a second path parallel to its first path in which it bears against the fulcrum 92 with sufficient force to overcome the spring 83 (Fig. 3) and rock the lever 49 and the valve piston rod 387 about the axis of the latter sufficiently to carry the upper end 49a of the lever out of its first path, that of the collars 24 and 26, and into a second path alignment with a pair of stop screws 94 and 95 on the member 92. The handle is then swung about the pivot 82 in its second path, which is parallel to but displaced from the first path, until the upper end 49a of the lever 49 contacts one of the stop screws 94 or 95. These stop screws 94 and 95 are so adjusted that when the lever end 49a is moved into contact therewith, the valve is opened only slightly as shown in Fig. 8, so that the pressure drop in the passage 387a or the passage 387b is insufficient to hold the valve in operated position. Therefore, if, after moving the lever as described to carry the lever end 49a against one of the stop screws 94 or 95, the operator releases the handle 90, it and the valve are automatically restored to normal position by the valve centering spring 42 (Fig. 5) and the lever restoring spring 90c (Fig. 3).

Occasion may arise when the operator wishes to move the piston rod 19 rapidly to a position beyond that corresponding to the settings of the collars 24 and 26. He can do this by rocking the handle 90 into a third path parallel to and intermediate its first and second paths, which moves the upper end 49a of the lever into a third path intermediate and parallel to its first and second paths previously described, in which its swing about the pivot 82 is interrupted neither by the collars 24 or 26 nor the stop screws 94 or 95. It is to be noted that during this mode of operation the pressure force exerted on the end 38a or 38b of the valve piston 38 by the pressure fluid can be readily overcome by the operator. Furthermore, if the operator fails to manually restore the valve to neutral position before the piston 16 reaches the end of its stroke, restoration of the valve piston to normal is automatically effected by the centering spring 42, because when fluid ceases to flow from the motor cylinder there is no longer any pressure drop through the passage 387a or 387b.

The modification shown in Figs. 10 to 13 has the same internal valve construction as that described except that the valve piston, in addition to having the extension 387 extending from the right end of the valve cylinder, has an extension 386b extending from the left end thereof to which a handle 101 is connected, an arm 102 constituting a shoulder element for actuation by the collars 24 and 26 of the piston rod member 23 being secured to the right extension 387.

The shoulder element 102 is rigidly connected to the extension 387 for both longitudinal and rotary movement therewith by nuts 103 and 104 screwed onto the threaded end 105 thereof.

The handle 101 is pivoted to the left extension 386b of the valve piston rod by a pivot pin 106 for rotation in a longitudinal plane with respect to the piston rod and rotation with the piston rod about the axis of the latter. The lower end of the handle 101 is bifurcated at 101a and straddles a bolt 107 which functions as a fulcrum for the handle. The lower end 101a of the handle is yieldably held against the head 108 of the bolt 107 by a helical compression spring 109 which surrounds the bolt 107 and is compressed between the end portion 101a of the handle and the head of the motor cylinder 15. When the handle 101 is in its normal position, as shown in full lines in Figs. 10, 12 and 13, the shoulder element 102 is in the path of the collars 24 and 26 on the motor piston rod member 23, so that when the handle has been actuated in one direction or the other out of neutral position to reciprocate the motor piston and the piston rod member 23, one or the other of the two collars 24 or 26 contacts the shoulder member 102 at the end of the stroke to shift the valve control member back into neutral position.

However, if the handle 101 is rocked clockwise into its second path of movement, as shown in dotted lines in Fig. 13, compressing the spring 109 in so doing, the shoulder element 102 is carried out of the path of the collars 24 and 26 so that the operator can, if he so desires, shift the piston beyond the limit positions determined by the settings of the collars.

To limit the degree of opening of the valve in the low speed (second) path of the handle 101, a stop screw 110 is provided on the shoulder element 102, and a stop screw 111 is provided on a flange 112 on the left end of the valve cylinder body 16. The stop screw 110 on the shoulder element 102 is normally clear of an end plate 114 on the valve body 16, but is juxtaposed to this plate 114 (Fig. 12) when the handle and shoulder element 102 are rocked into the low speed position shown in dotted lines in Figs. 12 and 13. The other low speed stop 111 is normally clear of the handle 101, as shown in Fig. 13, but is juxtaposed thereto when it is in the low speed position shown in dotted lines in Fig. 13.

A single high speed stop screw 116 is shown in Figs. 11 and 13 which is in the first or normal path of the handle 101. This stop 116 is not always necessary, but is sometimes desirable, particularly when the motor is connected to a heavy ground-working implement, to limit the speed at which the implement drops.

As shown, the handle 101 of the modification of Figs. 10 to 13 does not have a third parallel path of movement corresponding to the third path of the lever 99 in the embodiment of Figs. 1 to 3, but such a third path can be provided if desired by relocating stops 114 and 116 so that in an intermediate (third) path between the first and second paths, lever 102 is out of the path of the collars 24 and 26, the handle 101 clears the stops 111 and 116, and the stop 110 clears the stop 114.

It will be obvious that the mounting of the handle 101 directly on the opposite end of the valve control member from the shoulder element 102 provides a simpler construction in some respects as compared to the handle arrangement of Figs. 1, 2 and 3, and is more suitable for some installations.

Although for the purpose of explaining the invention, a particular embodiment thereof has been shown and described, obvious modifications will occur to a person skilled in the art, and we do not desire to be limited to the exact details shown and described.

We claim:

1. Hydraulic apparatus comprising: a hydraulic motor having a piston and piston rod adapted to be reciprocated thereby; a valve for controlling fluid flow to said motor and having a control member reciprocable in each direction from a neutral position, in which the piston is locked, into positions for moving the piston in opposite directions; and actuating mechanism including a control handle movable through a plurality of selectable parallel paths in opposite directions from a neutral position, for shifting said control member; said actuating mechanism including a shoulder element movable by said control handle into and through a selected one of a plurality of parallel paths corresponding to said parallel paths of said control handle, the movement of said shoulder element within any one of its parallel paths corresponding to the movement of said control member into and out of neutral position; spring means yieldably urging said handle and shoulder element into a first of said parallel paths; and a member reciprocated by said piston rod for engaging said shoulder element and shifting said actuating mechanism into neutral position when the shoulder element is in its said first path and the piston rod reaches a predetermined position.

2. Apparatus in accordance with claim 1 including stop means in a second of said parallel paths for engaging said shoulder element and arbitrarily limiting extent of movement of said handle out of neutral position when said handle is in said second path.

3. Apparatus in accordance with claim 2 including a third unobstructed path of movement for said shoulder element parallel to said first and second paths.

4. Apparatus according to claim 1 in which said control member comprises a shaft reciprocable along and rotatable about its axis said actuating mechanism comprises a lever pivotally connected to said shaft for rocking movement about an axis extending transversely through said shaft; means pivotally supporting one end of said lever against linear movement parallel to said shaft while permitting limited swinging movement of said one end about the axis of said shaft.

5. Apparatus according to claim 4 in which said spring means bears against said pivotally supported one end of said lever.

6. Apparatus according to claim 4 in which said handle is pivotally connected to said lever for rocking movement with respect thereto about an axis extending approximately radially with respect to the pivotal axis of said one end of said lever; said handle having an intermediate portion substantially displaced from the pivotal axis of said handle; and a stationary fulcrum member positioned for said portion of said lever to bear against.

7. Apparatus according to claim 6 including spring means urging said handle about its pivotal axis in direction to bear against said stationary fulcrum.

8. Apparatus according to claim 1 in which said control member comprises a valve piston element reciprocable and rotatable in said valve, and said handle and shoulder element are connected to said valve piston element for movement therewith.

9. Apparatus according to claim 8 in which said valve piston element extends out of said valve at both ends, said handle is connected to one end of said piston element and said shoulder element is connected to the other end.

CLINTON E. DEARDORFF.
ALVIN A. MEDDOCK.

REFERENCES CITED

The following references are of record in the file of this patent:

UNITED STATES PATENTS

| Number | Name | Date |
| --- | --- | --- |
| 2,286,256 | Brown | June 16, 1942 |
| 2,311,516 | Brown | Feb. 16, 1943 |